United States Patent
Hazra et al.

(10) Patent No.: US 12,393,995 B2
(45) Date of Patent: Aug. 19, 2025

(54) ENHANCING GREENHOUSE GAS EMISSION ESTIMATES FOR STUBBLE BURNING AREAS

(71) Applicant: INTERNATIONAL BUSINESS MACHINES CORPORATION, Armonk, NY (US)

(72) Inventors: Jagabondhu Hazra, HBR Layout (IN); Manikandan Padmanaban, Chennai (IN); Isaac Waweru Wambugu, Nairobi (KE); Lloyd A Treinish, Cortlandt Manor, NY (US); Ivan Kayongo, Nairobi (KE); Kumar Saurav, Bhojpur (IN); Ranjini Bangalore Guruprasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/805,926

(22) Filed: Jun. 8, 2022

(65) Prior Publication Data
US 2023/0401653 A1 Dec. 14, 2023

(51) Int. Cl.
*G06Q 50/02* (2024.01)
*G06Q 10/063* (2023.01)

(52) U.S. Cl.
CPC .......... *G06Q 50/02* (2013.01); *G06Q 10/063* (2013.01)

(58) Field of Classification Search
CPC ............................. G06Q 50/02; G06Q 10/063
See application file for complete search history.

(56) References Cited

U.S. PATENT DOCUMENTS

| 7,966,971 | B2 | 6/2011 | Zimmerman |
| 8,595,020 | B2 | 11/2013 | Marino |
| 10,705,204 | B2 | 7/2020 | Klein |
| 11,704,581 | B1 | 7/2023 | Mcentire |
| 11,893,788 | B2 * | 2/2024 | Mohite ............... G06V 20/188 |

(Continued)

FOREIGN PATENT DOCUMENTS

| AU | 2016203849 B2 | 4/2018 |
| CN | 103714507 A | 4/2014 |

(Continued)

OTHER PUBLICATIONS

Abdurrahman, Stubble burning: Effects on health & environment, regulation, and management practices, Dec. 2020, Science Direct; vol. 2, pp. 1-27 (Year: 2020).*

(Continued)

*Primary Examiner* — Dylan C White
(74) *Attorney, Agent, or Firm* — Elliot J. Shine

(57) ABSTRACT

A method, computer system, and a computer program product for improving environmental impact estimations is provided. The present invention may include obtaining data pertaining to an agricultural area. The present invention may include deriving one or more features from the data pertaining to the agricultural area. The present invention may include identifying one or more stubble burning areas within the agricultural areas based on the one or more derived features. The present invention may include determining an environmental impact for each of the one or more stubble burning areas.

20 Claims, 7 Drawing Sheets

(56) References Cited

U.S. PATENT DOCUMENTS

| | | | |
|---|---|---|---|
| 12,118,626 | B2* | 10/2024 | Padmanaban .......... G06Q 50/02 |
| 2009/0288606 | A1 | 11/2009 | Zimmerman |
| 2011/0313666 | A1 | 12/2011 | Hirvi |
| 2013/0080213 | A1 | 3/2013 | Peters |
| 2013/0179078 | A1 | 7/2013 | Griffon |
| 2014/0172323 | A1 | 6/2014 | Marino |
| 2018/0156766 | A1 | 6/2018 | Zeng |
| 2019/0333163 | A1 | 10/2019 | Perry |
| 2020/0027096 | A1 | 1/2020 | Cooner |
| 2020/0256978 | A1* | 8/2020 | Klein .................. G01S 13/9005 |
| 2020/0275617 | A1 | 9/2020 | Fabijanski |
| 2021/0010993 | A1* | 1/2021 | Shibata ................ A01B 79/005 |
| 2021/0109209 | A1 | 4/2021 | Xin |
| 2021/0199600 | A1 | 7/2021 | Das |
| 2021/0224927 | A1 | 7/2021 | Perry |
| 2022/0117215 | A1* | 4/2022 | Sibley .................. A01M 7/0039 |
| 2022/0139081 | A1* | 5/2022 | Mohite ................ G06V 20/188 |
| | | | 382/110 |
| 2022/0412553 | A1* | 12/2022 | Haddad .................... F23J 15/04 |

FOREIGN PATENT DOCUMENTS

| | | |
|---|---|---|
| CN | 203838857 U | 9/2014 |
| CN | 204731612 U | 10/2015 |
| CN | 105759835 A | 7/2016 |
| CN | 105791767 A | 7/2016 |
| CN | 108922098 A | 11/2018 |
| CN | 104657566 B | 2/2019 |
| CN | 111178789 A | 5/2020 |
| CN | 111896680 A | 11/2020 |
| JP | 5972642 B2 | 8/2016 |
| KR | 20110017816 A | 2/2011 |
| WO | 2016132106 A1 | 8/2016 |
| WO | 2017048002 A1 | 3/2017 |
| WO | 2017216186 A1 | 12/2017 |

OTHER PUBLICATIONS

Author Unknown, "Capella X-SAR", Capella Space [online], [Accessed on Apr. 11, 22], 19 pages, Retrieved from the Internet: <URL: https://www.capellaspace.com/data/sar-imagery-products/>.

Ayehu, et al., "Combined Use of Sentinel-1 SAR and Landsat Sensors Products for Residual Soil Moisture Retrieval over Agricultural Fields in the Upper Blue Nile Basin, Ethiopia", Sensors [article], Jun. 2020, pp. 1-24, Retrieved from the Internet: <URL: https://www.researchgate.net/publication/342050469>.

Babu, et al., "Field Validation of DNDC Model for Methane and Nitrous Oxide Emissions from Rice-based Production Systems of India," Nutrient Cycling in Agroecosystems, 2006, pp. 157-174, vol. 74, DOI 10.1007/ $10705-005-6111-5, Retrieved from the Internet: < URL: https://link.springer.com/article/10.1007/s10705-005-6111-5>.

Ban, et al., "Near Real-Time Wildfire Progression Monitoring with Sentinel-1 SAR Time Series and Deep Learning", Scientific Reports [journal], 2020, pp. 1-15, vol. 10, Art. 1322, Retrieved from the Internet: <URL: https://www.nature.com/articles/s41598-019-56967-x,>.

Belenguer-Plomer, et al., "Burned area detection and mapping using Sentinel-1 backscatter coefficient and thermal anomalies", https://doi.org/10.1016/j.rse.2019.11134, Elsevier, ScienceDirect, Remote Sensing of Environment, 233, 2019, pp. 1-18.

Bhardwaj, et al., "Interstate transport of carbon monoxide and black carbon over India", https://doi.org/10.1016/j.atmosenv.2021.118268, Science Direct, Atmospheric Environment, vol. 251, 118268, Apr. 15, 2021, pp. 1-3.

Cai, et al., "Field validation of the DNDC model for greenhouse gas emissions in East Asian cropping systems", Global Biochemical Cycles, 2003, pp. 18-1 - 18-10, vol. 17, No. 4, DOI: 10.1029/2003GB002046.

Chawala et al., "Stubble burn area estimation and its impact on ambient air quality of Patiala & Ludhiana district, Punjab, India", https://www.ncbi.nlm.nih.gov/pmc/articles/PMC6965717/, CellPress, Heliyon 6, 2020, pp. 1-10.

Cressie et al., "Fixed rank kriging for very large spatial data sets", https://doi.org/10.1111/j.1467-9868.2007.00633.x. Royal Statistical Society, 70, Part 1, 2008, pp. 209-226.

Cui, et al., "A Soil Moisture Spatial and Temporal Resolution Improving Algorithm Based on Multi-Source Remote Sensing Data and GRNN Model," remote Sensing [article], Feb. 2020, 14 pages, vol. 12, DOI:10.3390/rs12030455, Retrieved from the Internet: <URL: https://www.researchgate.net/ publication/338966912_A_ Soil_Moisture_Spatial_and_Temporal_Resolution_Improving_Algorithm_Based_on_Multi-Source_Remote Sensing_Data_and_GRNN_Model>.

Cusworth, et al., "Quantifying the influence of agricultural fires in northwest India on urban air pollution in Delhi, India", https://iopscience.iop.org/article/10.1088/1748-9326/aab303, IOP Publishing, Environmental Research letters, 13, 044018, 2018, pp. 1-12.

Dijk, et al., "Spectral signature analysis of false positive burned area detection from agricultural harvests using Sentinel-2 data", https://doi.org/10.1016/j.jag.2021.102296, Elsevier, International Journal of Applied Earth Observations and Geoinformation, 97, 102296, 2021, pp. 1-13.

Disclosed Anonymously, "Farmers burn stubble at night to evade detection", The Hindu, Accessed Apr. 11, 2022, pp. 1-4, Retrieved from the Internet: <URL:https://www.thehindu.com/news/cities/Delhi/Farmers-burn-stubble-at-night-to-evade-detection/article16438583.ece>.

Disclosed Anonymously, "Fire Information for Resource Management System (FIRMS)", Earth Observation Data, LANCE: NASA Near Real-time Data and Imagery, Accessed Apr. 11, 2022, pp. 1-4, Retrieved from the Internet: <URL:https://earthdata.nasa.gov/earth-observation-data/near-real-time/firms>.

Disclosed Anonymously, "SAR Imagines", Principles of Remote Sensing, Centre for Remote imaging, Sensing and Processing, Accessed Apr. 11, 2022, pp. 1-7, Retrieved from the Internet: <URL: https://crisp.nus.edu.sg/~research/tutorial/sar_int.htm>.

EO Portal Directory, "Capella X-SAR," EO Portal, Satellite Missions, Airborne Sensors, Access Apr. 11, 2022, 32 Pages, Retrieved from the Internet: <URL: https://directory.eoportal.org/web/eoportal/satellite-missions/c-missions/capella-x-sar>.

Ernst et al., "Advances in the remote sensing of volcanic activity and hazards, with special consideration to applications in developing countries", https://www.researchgate.net/deref/http%3A%2F%2Fdx.doi.org%2F10.1080%2F01431160802168459, ResearchGate, International Journal of Remote Sensing, vol. 29, No. 22, Nov. 20, 2008, pp. 6687-6723.

Fassnacht, et al., "Using Sentinel-2 and canopy height models to derive a landscape-level biomass map covering multiple vegetation types", https://doi.org/10.1016/j.jag.2020.102236, Elsevier, ScienceDirect, International Journal of Applied Earth Observations and Geoinformation, 94, 2021, pp. 1-12.

Fernandez-Carrillo, et al., "Estimating prescribed fire impacts and post-fire tree survival in eucalyptus forests of Western Australia with L-band SAR data", https://www.sciencedirect.com/science/article/pii/S0034425719300604, Elsevier, ScienceDirect, Remote Sensing of Environment, 224, 2019, pp. 133-144.

Fong, et al., "Global Protocol for Community-Scale Greenhouse Gas Emission Inventories," World Resources Institute [report], 2014, 176 pages, Retrieved from the Internet: <URL: https://www.wri.org/research/global-protocol-community-scale-greenhouse-gas-emission-inventories>.

Gervirtz, et al., "Environmental Management Framework Databases Developed Utilizing High-Resolution Satellite Imagery and Their Utility for Environmental Monitoring," AAPG [AAPG Search and Discovery Article #91020] [abstract] 1995 [accessed on Oct. 6, 2021], 1 page, Retrieved from the Internet: <URL: https://www.searchanddiscovery.com/abstracts/html/1995/annual/abstracts/0033.htm%201/1>.

Ghosh, et al., "Aboveground biomass estimates of tropical mangrove forest using Sentinel-1 SAR coherence data—The superiority of deep learning over a semi-empirical model", https://doi.org/10.1016/j.cageo.2021.104737, Elsevier, ScienceDirect, Computers and Geosciences, 150, 2021, pp. 1-12.

(56) References Cited

OTHER PUBLICATIONS

Guo, et al., "Assessment of global carbon dioxide concentration using MODIS and GOSAT data," Sensors [article], Dec. 2012, 23 pages, vol. 12, DOI:10.3390/s121216368, Retrieved from the Internet: <URL: https://www.researchgate.net/publication/235740424_Assessment_of_global_carbon_dioxide_concentration_using_MODIS_and_GOSAT_data>.

Guo, et al., "Crop Classification Based on Differential Characteristics of H/a Scattering Parameters for Multitemporal Quad- and Dual-Polarization SAR Images", https://ieeexplore.ieee.org/document/8361777, IEEE Transactions on Geoscience and Remote Sensing, vol. 56, No. 10, Oct. 2018, pp. 6111-6123.

Ibm, "The Weather Company sample," IBM.com [documentation], [accessed on Oct. 6, 2021], 6 pages, Retrieved from the Internet: <URL: https://www.ibm.com/docs/en/cognos-analytics/11.1.0?topic=s-weather-company-sample>.

Jena, et al., "Performance of high resolution (400 m) PM2.5 forecast over Delhi", https://www.nature.com/articles/s41598-021-83467-8, Scientific reports, nature portfolio, 11:4104, 2021, pp. 1-9.

Ji, et al., "Scattering Mechanism Extraction by a Modified Cloude-Pottier Decomposition for Dual Polarization SAR", https://www.mdpi.com/2072-4292/7/6/7447, Remote Sensing, 7, 2015, pp. 7447-7470.

Jiang, et al., "Application of herbicides is likely to reduce greenhouse gas (N2O and CH4) emissions from rice wheat cropping systems," Atmospheric Environment [article], Apr. 2015, 14 pages, vol. 107, DOI:10.1016/j.atmosenv.2015.02.029, Retrieved from the Internet: <URL: https://www.researchgate.net/publication/272424278_Application_of_herbicides_is_likely_to_reduce_greenhouse_gas_N2O_and_CH4_emissions_from_rice-wheat_cropping_systems>.

Kachar, et al., "Detection and Modeling of Temperature Inversion in the Atmosphere Using Modis Images (Case Study: Kermanshah)," International Conference on Sensors & Models in Remote Sensing & Photogrammetry, 2015, pp. 357-363, vol. XL-1/W5, Retrieved from the Internet: <URL: https://www.int-arch-photogramm-remote-sens-spatial-inf-sci.net/XL-1-W5/357/2015/>.

Kulkarni, et al., "How Much Does Large-Scale Crop Residue Burning Affect the Air Quality in Delhi?", https://pubs.acs.org/doi/full/10.1021/acs.est.0c00329, ACS Publications, Mar. 19, 2020, pp. 1-7.

Laneve, et al., "The Daily Fire Hazard Index: A Fire Danger Rating Method for Mediterranean Areas", https://doi.org/10.3390/rs12152356, Remote sensing, 12, 2356, 2020, pp. 1-17.

Lasko, et al., "Satellites may Underestimate Rice Residue and Associated Burning Emissions in Vietnam", https://doi.org/10.1088/1748-9326/aa751d, IOP Publishing, Environmental Research Letters 12, 085006, 2017, pp. 1-14.

Li, et al., "Use of Satellite Remote Sensing Data for Modeling Carbon Emissions from Fires: A Perspective in North America", https://doi.org/10.1007/978-3-540-37293-6_18, SpringerLink, Earth Science Satellite Remote Sensing, Chapter 2177, 2006, pp. 1-23.

Li, et al., "High-Resolution Satellite Image Sources for Disaster Management in Urban Areas," [article], Jan. 2005, 17 pages, DOI:10.1007/3-540-27468-5_74, Retrieved from the Internet: <URL: https://www.researchgate.net/publication/266481091_High-Resolution_Satellite_Image_Sources_for_Disaster_Management_in_Urban_Areas>.

Liu, et al., "Comparison of Different Machine Learning Approaches for Monthly Satellite-Based Soil Moisture Downscaling over Northeast China", https://www.mdpi.com/2072-4292/10/1/31, Remote Sensing [article], 2018, pp. 1-23.

Liu, et al., "Crop residue burning practices across north India inferred from household survey data: Bridging gaps in satellite observation", https://doi.org/10.1016/j.aeaoa.2020.100091, Elsevier, ScienceDirect, Atmospheric Environment: X [journal], 8, 2020, pp. 1-13.

Mell, et al., "The NIST Definition of Cloud Computing", National Institute of Standards and Technology, Special Publication 800-145, Sep. 2011, 7 pages.

Min, et al., "DeNitrification-DeComposition (DNDC) Improvement through Model Coupling and Sub-model Development Considering Agricultural Land Use and Future Climate Change," Journal of Environmental Biology [article], Mar. 2017, 11 pgs., DOI:10.11626/KJEB.2017.35.1.037, Retrieved from the Internet: <URL: https://www.researchgate.net/publication/315829801_DeNitrification-DeComposition_DNDC_Improvement_through_Model_Coupling_and_Sub-model_Development_Considering_Agricultural_Land_Use_and_Future_Climate_Change.

Murphy et al., "Evaluating the ability of the differenced Normalized Burn Ratio (dNBR) to predict ecologically significant burn severity in Alaskan boreal forests", https://www.researchgate.net/publication/233993647_Evaluating_the_ability_of_the_differenced_Normalized_Burn_Ratio_dNBR_to_predict_ecologically_significant_burn_severity_in_Alaskan_boreal_forests, ResearchGate, CSIRO Publishing, International Journal of Wildland Fire 2008, 17, pp. 1-11.

Nassar, et al., "Improving the temporal and spatial distribution of CO2 emissions from global fossil fuel emission data sets," Journal of Geophysical Research Atmospheres [article], Jan. 2013, 18 pages, vol. 118, Retrieved from the Internet: <URL: https://www.researchgate.net/publication/255703703_Improving_the_temporal_and_spatial_distribution_of_CO2_emissions_from_global_fossil_fuel_emission_data_sets>.

Ngadze, et al., "Exploring the utility of Sentinel-2 MSI and Landsat 8 OLI in burned area mapping for a heterogenous savannah landscape", https://journals.plos.org/plosone/article?id=10.1371/journal.pone.0232962, PLoS ONE 15(5), e0232962, May 27, 2020, pp. 1-10.

Nguyen, et al., "Satellite Data Fusion of Multiple Observed XCO2 Using Compressive Sensing and Deep Learning", https://ieeexplore.ieee.org/document/9323861, IEEE International Geoscience and Remote Sensing Symposium, 2020, pp. 2073-2076.

Page, et al., "The amount of carbon released from peat and forest fires in Indonesia during 1997", https://www.nature.com/articles/nature01131, Nature Publishing Group, vol. 420, Nov. 7, 2002, pp. 61-65.

Pampanoni, et al., "Daily Fire Hazard Index for the Prevention and Management of Wildfires in the Region of Sardinia", https://www.researchgate.net/publication/335910852, Research Gate, Conference Paper, Sep. 2019, pp. 1-9.

Parker, et al., "Applications of Satellite Radar Imagery for Hazard Monitoring Insights from Australia", https://www.mdpi.com/2072-4292/13/8/1422/htm, Remote sensing, 13, 2021, pp. 1-25.

Qu, et al., "Earth Science Satellite Remote Sensing", https://www.sciencedirect.com/science/article/pii/S0303243420308795, Springer, Tsinghua University Press, vol. 1: Science and Instruments, 2006, pp. 1-445.

Ranchin, "Data fusion in remote sensing: examples, " Proceedings of the 4th annual conference on information fusion [article], Aug. 2001, 8 pages, Retrieved from the Internet: <URL: https://www.researchgate.net/publication/47805585_Data_fusion_in_remote_sensing_examples>.

Roy, et al., "Landsat-8 and Sentinel-2 burned area mapping—A combined sensor multi-temporal change detection approach", https://www.sciencedirect.com/science/article/pii/S0034425719302731, Elsevier, Remote Sensing of Environment, 231, 111254, 2019, pp. 1-21.

Sharma, et al., "Gridded Emissions of CO, NOx, SO2, CO2, NH3, Hci, CH4, PM2.5, PM10, Bc, and NMVOC from Open Municipal Waste Burning in India" https://pubs.acs.org/doi/full/10.1021/acs.est.8b07076, ACS Publications, Apr. 17, 2019, pp. 1-10.

Shi, et al., "Herbicide applications increase greenhouse gas emissions of alfalfa pasture in the inland arid region of horthwest China," PeerJ, May 25, 2020, 17 pages.

IBM: List of IBM Patents or Patent Applications Treated as Related (Appendix P), Jun. 8, 2022 2 pages.

U.S. Appl. No. 17/495,573, entitled "Generating Context-Aware Process-Based Model Determinations for Greenhouse Gas Emissions From Agricultural Fields", Filed Oct. 6, 2021, P202009092US01, 39 Pages.

U.S. Appl. No. 17/495,582, entitled "Enhancing Spatial and Temporal Resolution of Greenhouse Gas Emission Estimates for Agri-

(56) References Cited

OTHER PUBLICATIONS cultural Fields Using Cohort Analysis Techniques", Filed Oct. 6, 2021, P202009154US01, 45 Pages.

The Weather Company, an IBM Buisness, "CIO Insights: The future of intelligent farming & food supply chain management", ibm.com, 2019, 13 pages, Retrieved from the Internet: <URL: https://www.ibm.com/downloads/cas/2BRB2RQM>.

Tian, et al., "Coarse-to-Fine CNN for Image Super-Resolution", https://ieeexplore.ieee.org/document/9105085, IEEE Transactions on Multimedia, vol. 23, 2021, pp. 1489-1502.

Tonnang, et al., Ecological Modelling, Advances in crop insect modelling methods—Towards a whole system approach, Ecological Modeling Jun. 2017, pp. 88-103, vol. 354, Retrieved from the Internet: <URL: https://www.sciencedirect.com/science/article/pii/S030438001630549X>.

Unglesbee, "Dicamba Details—1: Temperature Inversions Increase Risk of Herbicide Drift," Progressive Farmer powered by DTN [dtnpf.com], Feb. 7, 2017 [accessed on Jun. 1, 2022], 2 pages, Retrieved from the Internet: <URL: https://www.dtnpf.com/agriculture/web/ag/crops/article/2017/02/07/temperature-inversions-increase-risk>.

Viswanathan, "Land Boundary Detection for Small Landholding Using Machine Learning", https://www.cropin.com/blogs/land-boundary-detection-for-small-landholding-using-machine-learning, Cropin, Apr. 6, 2021, pp. 1-11.

Wang, et al., "Area-to-point regression kriging for pan-sharpening", http://dx.doi.org/10.1016/j.isprsjprs.2016.02.006, Elsevier, ScienceDirect, ISPRS Journal of Photogrammetry and Remote Sensing, 114, 2016, pp. 151-165.

Wright, et al., "Automated volcanic eruption detection using MODIS", https://www.sciencedirect.com/science/article/abs/pii/S0034425702000305, Elsevier, Remote Sensing of Environment, 82, 2002, pp. 135-155.

Wu, et al., "Insects, An Advanced Numerical Trajectory Model Tracks a Corn Earworm Moth Migration Event in Texas, USA," Insects [article], 2018 16 pages, vol. 9, Article 115, DOI: 10.3390/insects9030115Retrieved from the Internet: <URL: https://www.mdpi.com/2075-4450/9/3/115>.

Xiao-Rui, et al., "Satellite remote-sensing technologies used in forest fire management", https://link.springer.com/article/10.1007/BF02856861, Journal of Forestry Research, 16(1), 2005, pp. 73-78.

Zhang, et al., "Study On Relation Between Insar Coherence and Soil Moisture", https://www.isprs.org/proceedings/XXXVII/congress/7_pdf/2_WG-VII-2/11.pdf, The International Archives of the Photogrammetry, Remote Sensing and Spatial Information Sciences. vol. XXXVII. Part B7. Beijing 2008, pp. 131-134.

Cui et al., Improving the DNDC biogeochemistry model to simulate soil temperature and emissions of nitrous oxide and carbon dioxide in cold regions, Science of The Total Environment, vol. 687, 2019.

Hamrani, et al., Machine learning for predicting greenhouse gas emissions from agricultural soils, 741 Science of The Total Environment 140338 (2020) (Year: 2020).

Thompson et al., Crop Protection, Potential for automatic weed detection and selective herbicide application, vol. 10, Issue 4, Aug. 1991, pp. 254-259.

Wang et al., Computers and Electronics in Agriculture, A review on weed detection using ground-based machine vision and image processing techniques, vol. 158, Mar. 2019, pp. 226-240.

Poore et al. "Reducing food's environmental impacts through producers and consumers", Science, Jun. 1, 2018, pp. 987-992, vol. 360, Issue 6392.

\* cited by examiner

ENHANCING GREENHOUSE GAS EMISSION ESTIMATES FOR STUBBLE BURNING AREAS

BACKGROUND

The present invention relates generally to the field of computing, and more particularly to using computing to estimate the environmental effects of common practices in agriculture.

Scientists have identified several greenhouse gases (GHG) that may be introduced into the earth's atmosphere through industrial, agriculture, transportation, amongst other human-driven activities which may alter radiative forcing. Such GHGs that may be at least partially responsible for the increase in global temperatures, including, for example, carbon dioxide ($CO_2$), nitrogen oxide ($N_2O$), methane ($CH_4$), hydrofluorocarbons, amongst other GHGs. To understand current and/or future effects of such emissions may require the ability to both determine their current inventory in the earth's climate system as well as additional contributions. To determine new contributions of GHGs may require methods to accurately measure such emissions at the source since for many types of emissions there may be no direct methods to measure them. One such practice area in which GHG emissions commonly occur may be stubble burning. Stubble burning may be the practice of intentionally setting fire to agricultural debris and/or straw stubble, left after the harvesting of grains and/or specific crops such as, rice and/or wheat, amongst others. Similar practices may also apply to intentional or accidental burning of grasses, weeds and other vegetation. There may be a further challenge associated with some types of intentional burning, namely a preference to avoid detection.

A typical approach may be to use remotely sensed observations from earth's orbit in determining new contributions of GHGs. While such data from satellites may provide near-global coverage of the inventory of some GHGs, they may have limitations in their ability in attributing portions to stubble burnt acreage for several reasons, such as, but not limited to, they may primarily estimate current inventory not direct emissions, they may only measure the partial column in the atmosphere, and/or the quality of the observations may be impacted by at least, cloud cover, low spatial resolution and update frequency compared to the size of stubble burning areas and how long the material may be burning, respectively.

SUMMARY

Embodiments of the present invention disclose a method, computer system, and a computer program product for environmental impact estimations. The present invention may include obtaining data pertaining to an agricultural area. The present invention may include deriving one or more features from the data pertaining to the agricultural area. The present invention may include identifying one or more stubble burning areas within the agricultural areas based on the one or more derived features. The present invention may include determining an environmental impact for each of the one or more stubble burning areas.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
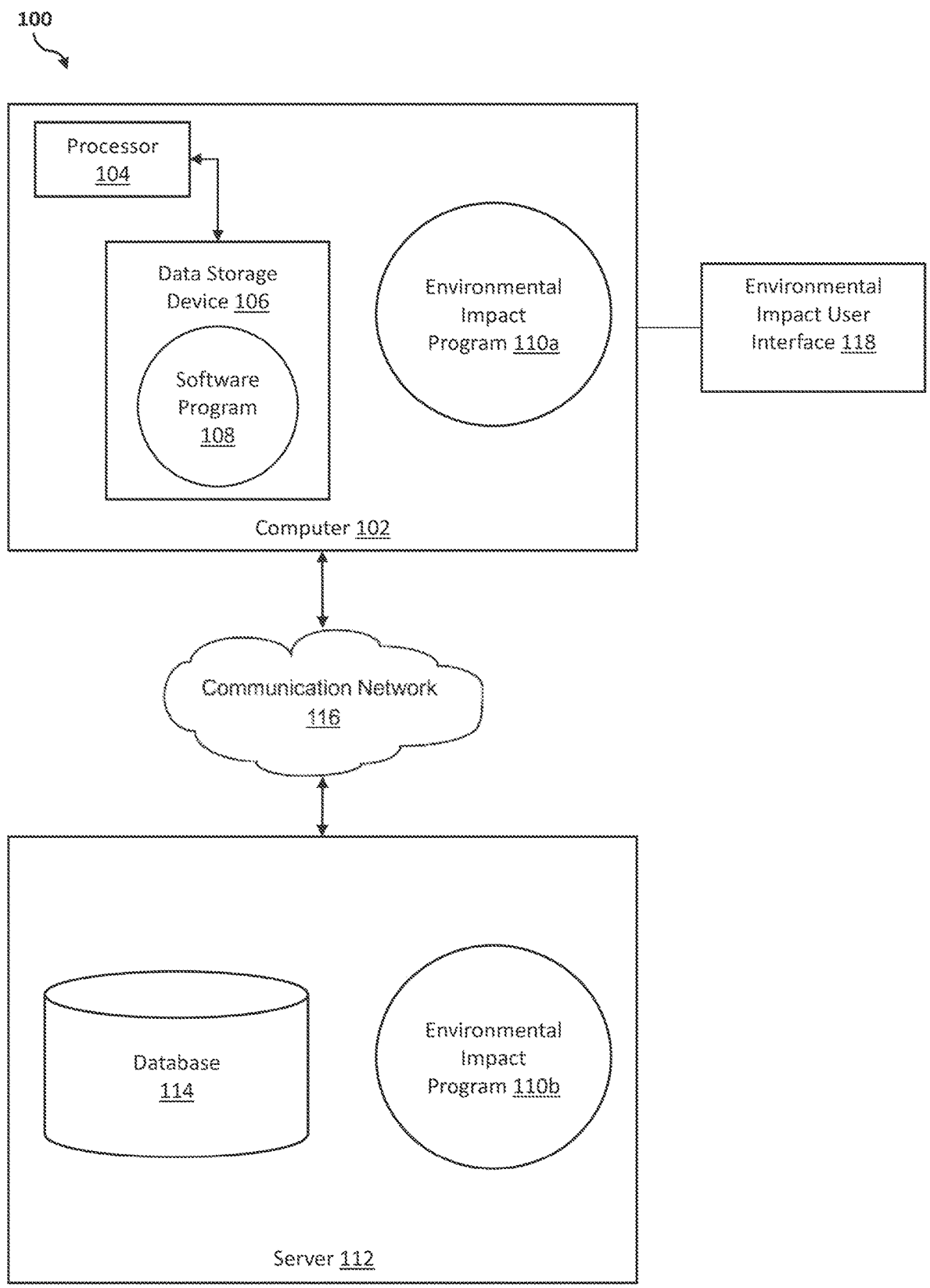
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for environmental impact estimations. As such, the present embodiment has the capacity to improve the technical field of climate-related technologies by accurately pinpointing one or more stubble burning areas leveraging at least Synthetic Aperture Radar (SAR) interferometric signal superposition and back-scattering decomposition. More specifically, the present invention may include obtaining data pertaining to an agricultural area. The present invention may include deriving one or more features from the data pertaining to the agricultural area. The present invention may include identifying one or more stubble burning areas within the agricultural areas based on the one or more features derived. The present invention may include determining an environmental impact for each of the one or more stubble burning areas.

As described previously, scientists have identified several greenhouse gases (GHG) that may be introduced into the earth's atmosphere through industrial, agriculture, transportation, amongst other human-driven activities which may alter radiative forcing. Such GHGs that may be at least partially responsible for the increase in global temperatures, including, for example, carbon dioxide ($CO_2$), nitrogen oxide ($N_2O$), methane ($CH_4$), hydrofluorocarbons, amongst other GHGs. To understand current and/or future effects of such emissions may require the ability to both determine their current inventory in the earth's climate system as well as additional contributions. To determine new contributions of GHGs may require methods to accurately measure such emissions at the source since for many types of emissions there may be no direct methods to measure them. One such practice area in which GHG emissions commonly occur may be stubble burning. Stubble burning may be the practice of intentionally setting fire to agricultural debris and/or straw stubble, left after the harvesting of grains and/or specific crops such as, rice and/or wheat, amongst others. Similar practices may also apply to intentional or accidental burning of grasses, weeds and other vegetation. There may be a further challenge associated with some types of intentional burning, namely a preference to avoid detection because of violation of local regulations.

A typical approach may be to use remotely sensed observations from earth's orbit in determining new contributions of GHGs. While such data from satellites may provide near-global coverage of the inventory of some GHGs, they may have limitations in their ability in attributing portions to stubble burnt acreage for several reasons, such as, but not limited to, they may primarily estimate current inventory not direct emissions, they may only measure the partial column in the atmosphere, and/or the quality of the observations may be impacted by at least, cloud cover, low spatial resolution and update frequency compared to the size of stubble burning areas and how long the material may be burning, respectively.

Therefore, it may be advantageous to, among other things, obtain data pertaining to an agricultural area, derive one or more features from the data pertaining to the agricultural area, identify one or more stubble burning areas within the agricultural area based on the one or more derived features, and determine an environmental impact for each of the one or more stubble burning areas.

According to at least one embodiment, the present invention may improve the accuracy and precision by which stubble burning areas may be identified. Stubble burning may be one of the key sources of agricultural emissions in many countries. Stubble burning activities may often be performed at night and/or under other conditions which may decrease the ability to reliably monitor such activities. The present invention utilizes data from remote active microwave sensors (e.g., Synthetic Aperture Radar, SAR) amongst other data to overcome limitations of remotely sensed optical images and/or other data which may be derived from visible and/or infrared portions of the spectrum, which may be corrupted by the presence of at least, clouds, smoke, and/or aerosols in the atmosphere above the burning sites.

According to at least one embodiment, the present invention may improve the ability to determine an environmental impact of stubble burning areas by leveraging remotely sensed satellite observations as well as in-situ and/or contextual data.

According to at least one embodiment, the present invention may improve spatial and temporal resolution of an agricultural area by leveraging contextual data corresponding to an agricultural area as well as identifying one or more cohorts (e.g., groups) similar to the agricultural area in which available contextual data may be leveraged.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an environmental impact program 110a. The networked computer environment 100 may also include a server 112 that is enabled to run an environmental impact program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the environmental impact program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the environmental impact program 110a, 110b (respectively) to identify one or more stubble burning areas and determine an environmental impact for each of the one or more stubble burning areas. The environmental impact method is explained in more detail below with respect to FIGS. 2 through 4.

Figure 2:
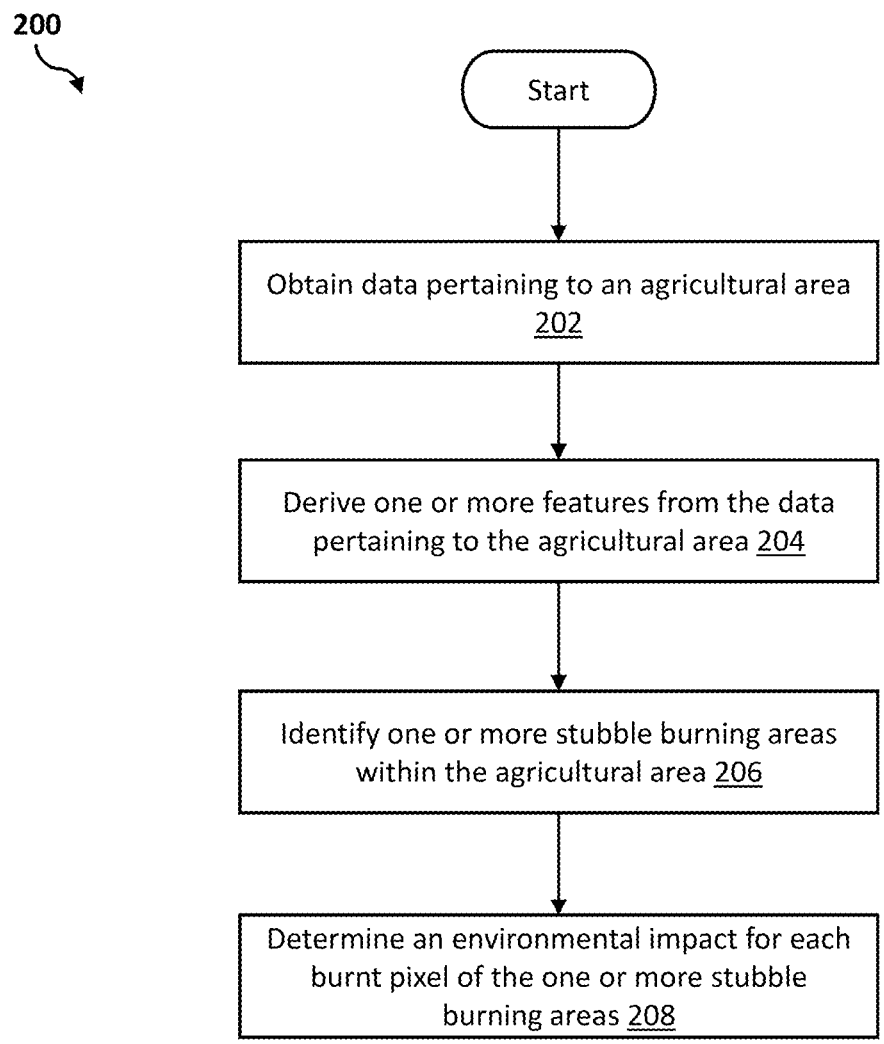
FIG. 2 is an operational flowchart illustrating a process for environmental impact estimations according to at least one embodiment.

Referring now to FIG. 2, an operational flowchart illustrating the exemplary environmental impact process 200 used by the environmental impact program 110a and 110b (hereinafter, the environmental impact program 110) according to at least one embodiment is depicted.

At 202, the environmental impact program 110 obtains data pertaining to an agricultural area. Data pertaining to the agricultural area may include, but is not limited to including, contextual information, synthetic-aperture radio detection and ranging (RADAR) (SAR) reflectance data, and/or interferometric synthetic-aperture radar (InSAR) data, amongst other data which may be obtained by the environmental impact program 110 pertaining to the agricultural area.

The agricultural area may be a specific region and/or one or more agricultural fields identified by a user in an environmental impact user interface 118. The environmental impact user interface 118 may be displayed by the environmental impact program 110 in at least an internet browser, dedicated software application, and/or as an integration with a third party software application. The agricultural area identified by the user may be comprised of a plurality of pixels, wherein each pixel corresponds to an area on the ground (e.g., by spatial resolution, Ground Sample Distance (GSD), and/or a geographic bounding box).

The data pertaining to the agricultural area may be continuously obtained by the environmental impact program 110 as additional data becomes available for the agricultural area and/or in predetermined time increments. The predetermined time increments may depend on the source of the data and/or may be based on user preferences. User preferences may be configured by the user in an environmental impact user interface 118. Data obtained by the environmental impact program 110 may be stored in a knowledge corpus (e.g., database 114) maintained by the environmental impact program 110.

The contextual information pertaining to the agricultural area which may be obtained by the environmental impact program 110 may include, but is not limited to including, weather data, calendar events data, regional data, seasonal data, vegetative cover data, traffic data, residential power consumption, farming practices, soil conditions, Normalized Difference Vegetation Index (NDVI) data, infrared (IR) images, Crop Identification (Crop ID), and/or Normalized Burn Ratio (NBR) data, amongst other contextual information pertaining to at least one or more agricultural fields of the agricultural area. The contextual information may be derived from at least satellite imagery and/or satellite data, publicly available resources, and/or existing knowledge bases, such as, but not limited to optical imagery from Landsat (e.g., Landat-8, Landsat-9), Operational Land Imager-2 (OLI-2), Sentinel (e.g., Sentinel-2A, Sentinel-2B Multispectral Instrument (MSI), Terra MODIS (or Moderate Resolution Imaging Spectroradiometer) and/or Aqua MODIS. The contextual information obtained by the environmental impact program 110 may vary with respect to the one or more regions and/or agricultural fields comprising the agricultural area. The user may be able to compare the contextual information available for each of the one or more agricultural fields in the environmental impact user interface 118 and either select or unselect contextual information to be obtained by the environmental impact program 110 for the agricultural area. As will be explained in more detail below, the environmental impact program 110 may leverage data received from one or more regions and/or agricultural fields for other agricultural fields and/or regions which share farm-specific characteristics.

SAR reflectance data pertaining to the agricultural area which may be obtained by the environmental impact program 110 may include complex polarization signals, such as, but not limited to vertical transmit, horizontal receive (VH) signals and/or vertical transmit, vertical receive (VV) signals. As will be explained in more detail below, the environmental impact program 110 may utilize an increase in VV and/or VH in identifying one or more stubble burning areas within the agricultural area. SAR reflectance data may be obtained by the environmental impact program 110 from at least active microwave sensors, multi-spectral optical images, satellite imagery and/or satellite data, publicly available resources, amongst other sources.

InSAR data pertaining to the agricultural area which may be obtained by the environmental impact program 110 may include InSAR data derived from a phase difference between two complex radar SAR observations of the agricultural area. As will be explained in more detail below, InSAR data may be derived utilizing radar waves, the response of an active microwave transmitter onboard a spacecraft and/or aircraft (i.e., a RADAR system) to surface and subsurface conditions, as opposed images that may capture a surface reflectance of solar radiation in the visible and/or infrared portions of the spectrum of light which may enable InSAR images to track ground deformation in inclement weather, cloudy conditions, and/or at night.

At 204, the environmental impact program 110 derives one or more features from the data pertaining to the agricultural area. The environmental impact program 110 may derive the one or more features for each of the one or more regions and/or agricultural fields which may comprise the agricultural area identified by the user. The one or more features may include, but are not limited to including, SAR reflectance decomposition, SAR power spectrum, signal superposition, and/or cohort analytics. As will be explained in more detail below, the SAR power spectrum and signal superposition may be time series features, which may be normalized and/or scaled based on the cohort analytics. The SAR reflectance decomposition may include categorical features.

The environmental impact program 110 may derive the SAR reflectance decomposition features from the SAR reflectance data pertaining to the agricultural area obtained by the environmental impact program 110 at step 202. The environmental impact program 110 may utilize one or more polarimetric methods in deriving the SAR reflectance decomposition, such as, but not limited to, the Cloude-Pottier Decomposition method. The one or more polarimetric methods may be utilized in decomposing the complex polarization signals to entropy (H) and alpha (a). The environmental impact program 110 may utilize a combination of the entropy (H) and alpha (a) in extracting a type of scattering based on derived categorial features of a zone in the entropy-alpha plane. Scattering mechanisms may include, but are not limited to including, surface scattering, double bounce scattering, and/or volume scattering. For example, the environmental impact program 110 may utilize 9 zones, each of the 9 zones in the entropy-alpha plane may be defined by its categorial features. Zone 1 may represent Low Entropy Surface Scatter, Zone 2 may represent Low Entropy Dipole Scatter, Zone 3 may represent Low Entropy Multiple Scatter, Zone 4 may represent Medium Entropy Surface Scatter, Zone 5 may represent Medium Entropy Dipole Scatter, Zone 6 may represent Medium Entropy Multiple Scatter, Zone 7 may represent High Entropy Surface Scatter, Zone 8 may represent High Entropy Dipole Scatter, and Zone 9 may represent High Entropy Multiple Scatter. In this example, the encoded features of Zone 4 may be effective at capturing vegetation biomass and Zone 1 may be effective of at capturing height. Accordingly, the environmental impact program may utilize the encoded features and/or differential characteristics of the entropy-alpha scattering parameters based on an active signal in classifying one or more crops within the agricultural area based on the SAR reflectance data obtained at step 202. As will be explained in more detail below, the SAR reflectance decomposition features may shift for an agricultural area and/or one or more agricultural fields over time which may be leveraged by the environmental impact program 110 in identifying one or more stubble burning areas.

The environmental impact program 110 may derive the SAR power spectrum from the SAR reflectance data pertaining to the agricultural area obtained by the environmental impact program 110 at step 202. The SAR power spectrum may be determined by the environmental impact program 110 utilizing the complex conjugate product of the dual polarized signals (e.g., VV and VH), wherein the SAR power spectrum may be a cross-polarized energy between the two complex signals. The SAR power spectrum may be a time series feature utilized by the environmental impact program 110 in capturing the change in SAR reflectance decomposition for an agricultural area and/or one or more agricultural fields. Continuing with the above example, the environmental impact program 110 may utilize the SAR power spectrum in capturing a change in vegetation and/or biomass over time as related to the encoded features of Zone 4. As will be explained in more detail below, the SAR power spectrum may be a range of numerical values which may differ depending on the type of crop for which the SAR reflectance data may be obtained. Accordingly, the SAR power spectrum features may be normalized utilizing cohort analytics prior to being utilized by the environmental impact program 110 as input for the trained machine learning model.

The environmental impact program 110 may derive the signal superposition from the InSAR data pertaining to the agricultural area obtained by the environmental impact program 110 at step 202. The environmental impact program 110 may utilize InSAR data captured at different time intervals in determining coherence and/or a change in coherence, which may measure phase consistency in space and/or time. As will be explained in more detail below, a change in the coherence may effectively capture stubble burning activity by capturing a change in height, vegetation and/or biomass, soil surface moisture over time based on constructive (e.g., coherent) interference and/or destructive (e.g., incoherent) interference for the agricultural area and/or one or more agricultural fields. The environmental impact program 110 may utilize the InSAR data in deriving an interferogram, which may take a difference between InSAR data of a corresponding agricultural area for each phase based on the constructive (e.g., coherent) interference and/or destructive (e.g., incoherent) interference. For example, InSAR data may be taken at three different phases (e.g., periods of times) for an agricultural area. First, the InSAR data may be of dry soil, because some of the incident microwave energy may be able to penetrate \the soil surface, which may result in less backscattering intensity. Later, the InSAR data may be of wet soil, for the same agricultural area. A large difference in electrical properties between water and air may result in a higher backscattering radar intensity than the backscattering intensity initially observed. At an even later time, the InSAR data may illustrate that same agricultural area is now flooded. The radar signal may be specularly reflected from the water surface, which may result in low backscattered intensity. Visualizations of the data from the flooded area may appear darker than those derived from the InSAR data for the dry and wet soil periods.

The environmental impact program 110 may utilize the following equation in determining the signal superposition based on the InSAR data:

$$\gamma = \frac{|\langle C_1 C_2^* \rangle|}{\sqrt{(\langle C_1 C_1^* \rangle \langle C_2 C_2^* \rangle)}}$$

In the above equation, y may represent the complex correlation coefficient between two SAR pixels of InSAR data captured at two different times. C 1 may represent the complex SAR signal at time 1 and C 2 may represent the complex SAR signal at time 2. As will be explained in more detail below, the signal superposition may be a range of numerical values which may differ depending on the type of crop for which the InSAR data may be obtained. Accordingly, the signal superposition features may be normalized utilizing cohort analytics prior to being utilized by the environmental impact program 110 as input for the trained machine learning model.

The environmental impact program 110 may derive the cohort analytics from the contextual inputs pertaining to the agricultural area obtained by the environmental impact program 110 at step 202. The contextual information obtained by the environmental impact program 110 at step 202 may include, but is not limited to including, weather data, calendar events data, regional data, seasonal data, vegetative cover data, traffic data, residential power consumption, farming practices, soil conditions, Normalized Difference Vegetation Index (NDVI) data, infrared (IR) images, Crop Identification (Crop ID), and/or Normalized Burn Ratio (NBR) data, amongst other contextual information which may be obtained by the environmental impact program 110 for each of the one or more regions and/or agricultural fields comprising the agricultural area. As will be explained in more detail below, the cohort analytics may be utilized by the environmental impact program 110 in at least identifying one or more cohorts (e.g., groups) within the agricultural area and/or normalizing numerical values of the one or more time series features SAR power spectrum (e.g., cross-polarized energy) and/or the signal superposition (e.g., change in coherence for different pairs of complex SAR signals) prior to the features being utilized as input for a trained machine learning model. The environmental impact program 110 may normalize the one or more time series features utilizing the cohort analytics in at least avoiding building a crop-specific model amongst other reasons.

At 206, the environmental impact program 110 identifies one or more stubble burning areas within the agricultural area. The environmental impact program 110 may utilize a trained machine learning model in classifying each pixel comprising the agricultural area as either an unburnt area or a burnt area.

The trained machine learning model may be a binary classification model. The binary classification model may utilize one or more machine learning algorithms in classifying each pixel of the agricultural area. The one or more machine learning algorithms may include, but are not limited to including, logistic regression, k-nearest neighbor, decision trees, support vector machine, amongst other machine learning algorithms. The machine learning model may be trained utilizing data from a verified fire information database such as Fire Information for Resource Management System (FIRMS) and/or other relevant datasets which may be utilized as a ground truth for the trained machine learning model.

The environmental impact program 110 may utilize the features of the SAR power spectrum, SAR decomposition, and signal superposition as input for the trained machine learning model. The environmental impact program 110 may normalize numerical values of the time series features (e.g., SAR power spectrum and signal superposition) utilizing the cohort analytics derived from the contextual inputs as discussed above with respect to step 204, which may enable the environmental impact program 110 to utilize a single binary classification model as opposed to a crop specific binary classification model. The environmental impact program 110, may utilize one or more normalization techniques in normalizing the derived SAR power spectrum and/or signal superposition prior to utilizing the numerical values as input for the trained machine learning model. The one or more normalization techniques may include, but is not limited to including, standardization (e.g., Z-score Normalization) and/or Min-Max scaling, amongst other normalization techniques. As will be explained in more detail below, the normalization of numerical features may be done for each cohort identified by the environmental impact program 110 but may not be done for categorial features (e.g., SAR decomposition).

The trained machine learning model may also leverage the identification of one or more cohorts (e.g., groups) in the binary classification of each pixel of the agricultural area as either an unburnt area (e.g., unburnt pixel) or a burnt area (e.g., burnt pixel). The environmental impact program 110 may identify the one or more cohorts (e.g., groups) within the agricultural area based on the cohort analytics derived features from the contextual information obtained by the environmental impact program 110 for each of the one or more regions and/or agricultural fields comprising the agricultural area. A cohort may be two or more agricultural fields and/or regions separated geographically within the agricultural area identified by the user in the environmental impact user interface 118 which share farm-specific characteristics.

In an embodiment, the environmental impact program 110 may identify the one or more cohorts utilizing a multi-class classification model. The multi-class classification model may utilize one or more machine learning algorithms in performing the multi-class classification, such as, but not limited to, k-nearest neighbors, decision trees, naïve bayes, random forest, gradient boosting, amongst others machine learning algorithms. The multi-class classification model may utilize the cohort analytics as input and classify each of the one or more agricultural fields and/or regions within the agricultural area based on a similarity score. The similarity score for each of the one or more agricultural fields and/or regions may be weighted such that different contextual information may impact the similarity score more than other contextual information. The weightings which may be applied by the environmental impact program 110 may be specified by the user within the environmental impact user interface 118. For example, the user may increase the weighting for crop identification such that the multi-class classification model may be more likely to classify two geographically separate fields growing corn to the same cohort.

The classification of each pixel by the binary classification model may be displayed by the environmental impact program 110 in the environmental impact user interface 118. The environmental impact program 110 may utilize unique colors, numbers, flags, and/or other visual representations in displaying the one or more stubble burning areas to the user in the environmental impact user interface 118.

At 208, the environmental impact program 110 determines an environmental impact for each burnt pixel of the one or more stubble burning areas. The environmental impact program 110 may utilize at least a portion of the contextual input and/or remotely sensed observations of GHGs corresponding to the one or more agricultural areas within the one or more stubble burning areas in determining the environmental impact for each burnt pixel of the one or more stubble burning areas.

The environmental impact program 110 may utilize a deep learning model and/or a statistical model in determining the environmental impact of each burnt pixel of the one or more stubble burnings areas. The deep learning model and/or the statistical model will be described in further detail below. The environmental impact program 110 may utilize at least a portion of the contextual input and/or remotely sensed observations of GHGs as input for the deep learning model and/or statistical model.

The portion of the contextual input which may be utilized as input for the deep learning model and/or statistical model, may include one or more explanatory variables (e.g., covariates) responsible for greenhouse gas (GHG) estimation as will be explained in more detail below. The one or more explanatory variables responsible for GHG estimation may include, but is not limited to including, estimated biomass and/or estimated crop residual moisture content, amongst other explanatory variables. The one or more explanatory variables utilized by the environmental impact program may be fine spatial resolution and/or temporal resolution data. Spatial resolution (e.g., Ground Sample Distance (GSD)) may refer to the size of one pixel on the ground. For example, a 10 kilometer pixel means that one pixel on an image corresponds to a square of 10 by 10 kilometers on the ground. Temporal resolution and/or update frequency may refer to how often data may be collected for the same agricultural field and/or region within the agricultural area. The environmental impact program 110 may derive the estimated biomass from at least the Crop ID data obtained at step 202 for each of the one or more stubble burning areas identified at step 206. The environmental impact program 110 may derive the estimated crop residual moisture content from at least the weather data and/or SAR imagery obtained at step 202 for each of the one or more stubble burning areas identified at step 206.

Remotely sensed observations of GHGs which may be utilized as input for the deep learning model and/or statistical model, may be obtained from sources such as, but not limited to The Greenhouse Gases Observing Satellite TANSO-FTS, Orbiting Carbon Observatory-2 or Sentinel-5p TROPOMI, amongst other GHG data sources. The environmental impact program 110 may derive an estimated change in GHG emissions for each of the one or more burnt pixels of the one or more stubble burning areas from the remotely sensed observations of GHGs, which may be utilized as input for the deep learning model and/or statistical model. The estimated change in GHG emissions may be the derivative of the actual GHG emissions data obtained from the one or more GHG emission data sources for two or more different time instants. The estimated change in GHG emissions data may be coarse spatial resolution and/or coarse temporal resolution data (e.g., low spatial resolution and/or low temporal resolution). The remotely sensed observations of GHGs may provide GHG data at a low spatial resolution (e.g., little detailed information on the ground) and/or with infrequent updates for the one or more agricultural areas within the one or more stubble burning areas. As will be explained in more detail below the environmental impact program 110 may leverage the one or more explanatory variables responsible for GHG emissions in enhancing the spatial and/or temporal resolution of the change in GHG emissions data.

The input for the deep learning and/or statistical model, which may include at least, the estimated biomass, estimated crop residual moisture content, and/or change in GHG emissions data may be time series features. For example, Time Interval 1 may be pre-harvest data received from the one or more agricultural areas within one of the stubble burning areas, Time Interval 2 may be post-harvest data received from the one or more agricultural areas within one of the stubble burning areas, and Time Interval 3 may be post-burning data received from the one or more agricultural areas within one of the stubble burning areas. In this embodiment, Crop ID data may be utilized for Time Interval 1, weather data and SAR imagery may be utilized for Time Interval 2, and/or remotely sensed observations of GHGs may be utilized for two or more of the time intervals wherein at least one of the time intervals is Time Interval 3.

The deep learning model may be a convolutional neural network (CNN) based model in which the explanatory variables may be upscaled using one or more standard interpolation techniques for different resolutions. The environmental impact program 110 may start with coarse spatial resolution (e.g., low spatial resolution) and perform layer by layer enhancement using the stacked super resolution CNN. The stacks of explanatory variables and the remotely sensed observations of GHGs (e.g., coarse estimates of emissions) may be utilized by the environmental impact program 110 in conjunction with the CNN to learn the functional mapping between finer resolution and coarse resolution GHG data. The fine resolution of the estimated crop residual moisture content and/or estimated biomass in conjunction with the Crop ID and identified one or more stubble burning areas may be utilized as an explanatory channel for layer-by-layer enhancement of the coarse resolution change in GHG emissions by the stacked super resolution CNN. For example, the GHG emissions data may be available at 10 kilometers resolution while the explanatory variables such as biomass estimates, crop residual moisture content estimates, Crop ID, and identified burnt pixels within the one or more stubble burning areas may be available at 10 meters resolution. In this example, the environmental impact program 110 may leverage the deep learning model, such as the stacked super resolution CNN technique, to enhance the spatial resolution of the GHG emissions data by utilizing the coarse resolution GHG emissions data as well as the fine resolution explanatory variables data as input enabling the deep learning model to map the GHG emissions data to finer resolutions. In this example, the environmental impact program 110 may create the explanatory variables at different resolutions by applying an average or maximum pooling for the layer by layer stacked super resolution CNN.

The statistical model may utilize one or more statistical based methods, such as, but not limited to Fixed rank kriging (FRK) (e.g., area to point regression) to allocate emitted gases to a finer spatial resolution from a coarse resolution (e.g., low spatial resolution). The statistical model may utilize the estimates of biomass and/or crop residual moisture content amongst other fine spatial resolution estimates as input. The statistical model may also utilize the change in GHG emissions derived from the remotely sensed observations of GHGs as input. The statistical model may be utilized to increase the spatial resolution of coarse input variables, such as GHG emission estimates, by leveraging one or more fine resolution covariates. For example, the environmental impact program 110 may leverage the FRK technique in enhancing the coarse resolution GHG emissions data by utilizing fine resolution covariates, such as, but not limited to, estimated biomass, estimates crop residual moisture content, acreage of the one or more stubble burning areas and/or burnt pixels, and Crop ID.

The environmental impact program 110 may utilize the output of the deep learning model and/or statistical model in estimating the GHG emissions at each pixel within the agricultural area classified at step 206 as a burnt pixel. The environmental impact program 110 may present the GHG emission data for one or more GHGs separately, such as, carbon dioxide (CO2), nitrogen oxide (N2O), methane (CH4), hydrofluorocarbons, amongst other GHG. The GHG emissions estimates for each pixel may be presented to the user within the environmental impact user interface 118. The environmental impact program 110 may also provide additional details and/or information with respect to each pixel in the environmental impact user interface 118.

Figure 3:
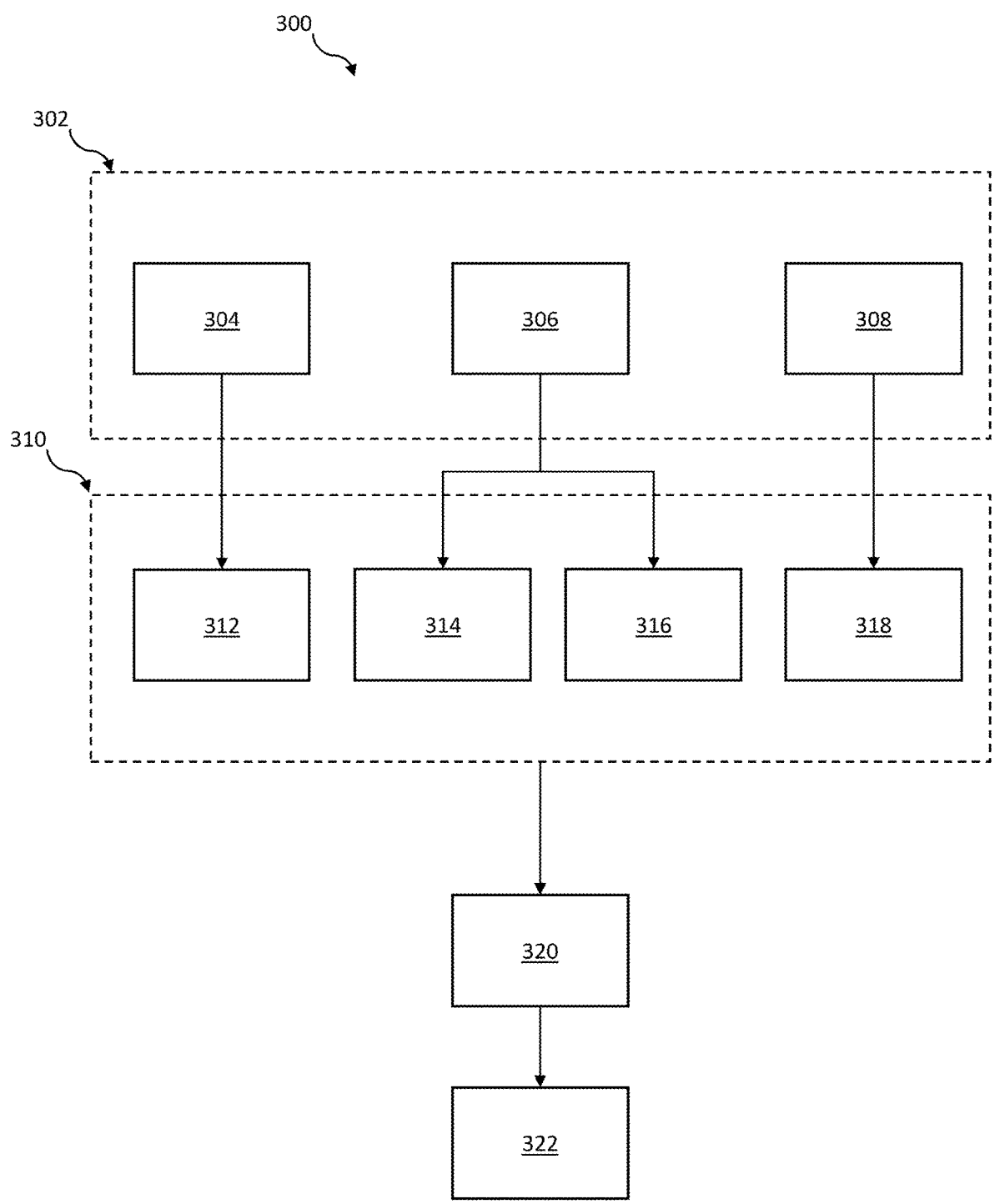
FIG. 3 is an operational flowchart illustrating a process for stubble burning identification.

Referring now to FIG. 3, an operational flowchart illustrating stubble burning identification process 300 used by the environmental impact program 110 according to at least one embodiment is depicted. The stubble burning identification process 300 of FIG. 3 is substantially similar to the environmental impact process 200 of FIG. 2.

Input data 302, may include contextual information 304, SAR reflectance data 306, and InSAR data 308. As described in more detail above with respect to step 202 the input data 302 may be obtained with respect to a specific region and/or one or more agricultural fields identified by the user in the environmental impact user interface 118.

Derived features 310, may include cohort analytics 312, SAR power spectrum 314, SAR decomposition 316, and SAR signal superposition 318. As described in more detail above with respect to step 204, the cohort analytics 312 may be derived from the contextual information 304, the SAR power spectrum 314 may be derived from the SAR reflectance data 306, the SAR decomposition 316 may be derived from the SAR reflectance data 306, and the signal superposition 318 may be derived from the InSAR data 308. The derived features 310 may be normalized utilizing the cohort analytics 312 prior to being utilized as input for the trained machine learning model 320.

The trained machine learning model 320 may be a binary classification model as described previously with respect to step 206. The trained machine learning model 320 may utilize the derived features 310 as input in identifying the one or more stubble burning areas 322 within the agricultural area based on the classification of pixels comprising the agricultural area.

Figure 4:
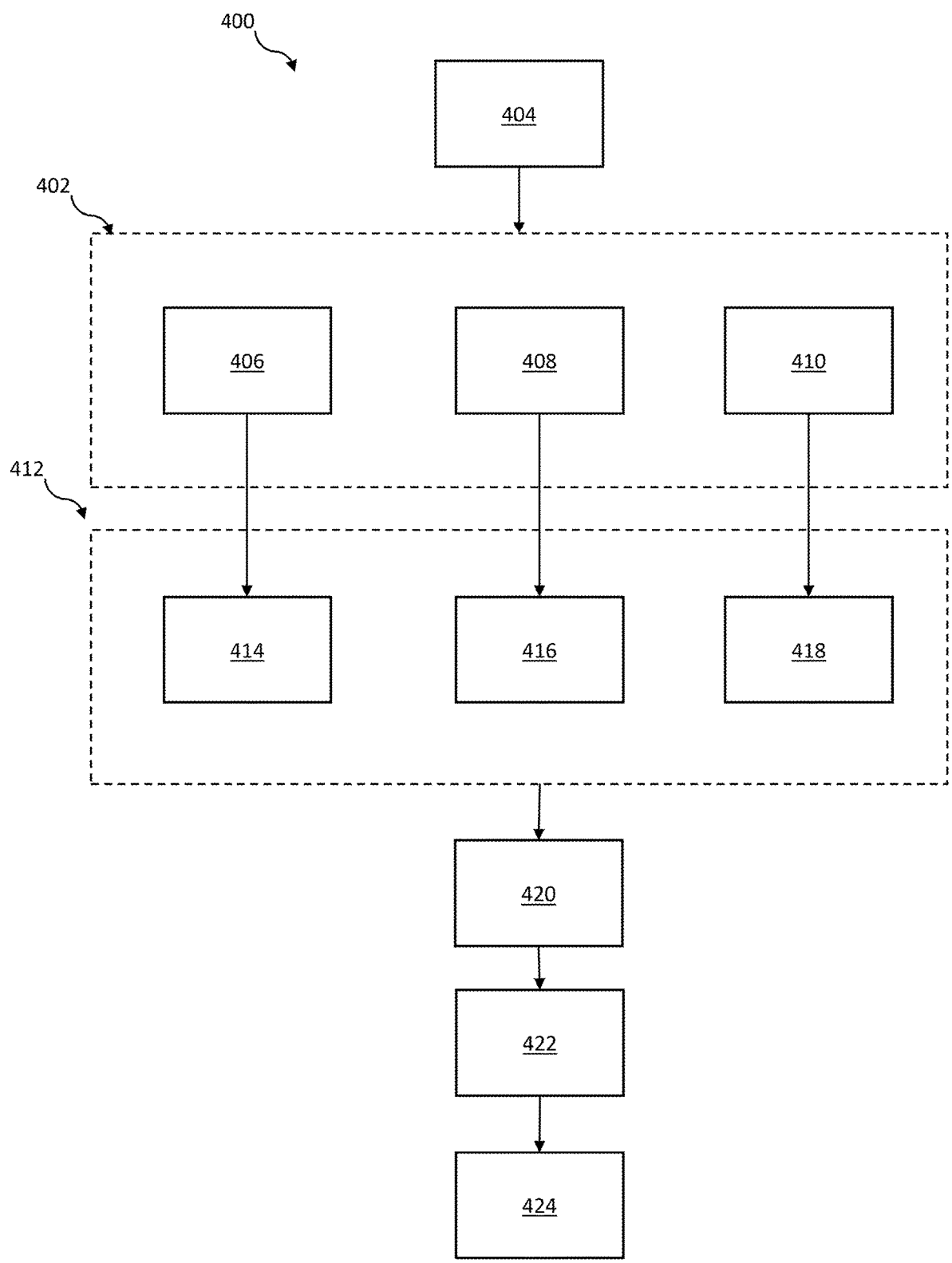
FIG. 4 is an operational flowchart illustrating a process for determining a pixel-level GHG emission.

Referring now to FIG. 4, an operational flowchart illustrating a pixel-level GHG emission process 400 used by the environmental impact program 110 according to at least one embodiment is depicted. The pixel-level process 400 of FIG. 4 is substantially similar to the environmental impact process 200 of FIG. 2

Input data 402, may include the one or more stubble burning areas 404, SAR imagery and weather data 406, Crop Identification data 408, and/or remotely sensed observations of GHGs 410. As described in more detail above with respect to step 208 the environmental impact program 110 may utilize the input data in deriving one or more features.

The derived features 412, may include estimated crop residual moisture content 414, estimated biomass 416, and/or change in GHG emissions. As described in more detail above with respect to step 208, the estimated crop residual moisture content 414 may be derived from the SAR imager and weather data 406, the estimated biomass 416 may be derived from the Crop Identification data 408, and the change in GHG emissions 418 may be derived from the remotely sensed observations of GHGs 410. The derived features 412 may be utilized as input for the machine learning model 420.

The machine learning model 420 may be a deep-learning model and/or a statistical model as detailed previously with respect to step 208. The machine learning model may utilize the derived features 412 as input in determining the estimated GHG emissions at each pixel 422. The estimated GHG emissions at each location in the data such as a pixel 422 may be utilized in determining a pixel-level impact score 424 as described in step 208 above.

It may be appreciated that FIGS. 2 through 4 provide only an illustration of one embodiment and do not imply any limitations with regard to how different embodiments may be implemented. Many modifications to the depicted embodiment(s) may be made based on design and implementation requirements.

Figure 5:
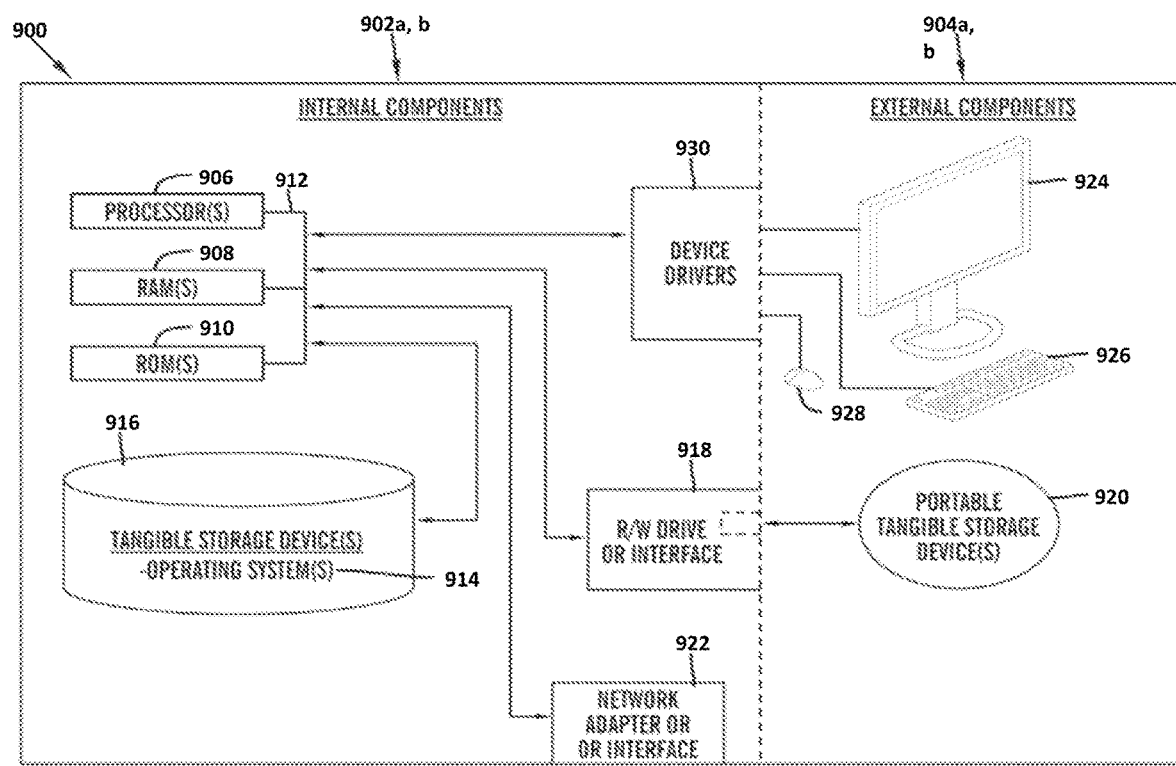
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the environmental impact program 110a in client computer 102, and the environmental impact program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the environmental impact program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the environmental impact program 110a in client computer 102 and the environmental impact program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the environmental impact program 110a in client computer 102 and the environmental impact program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
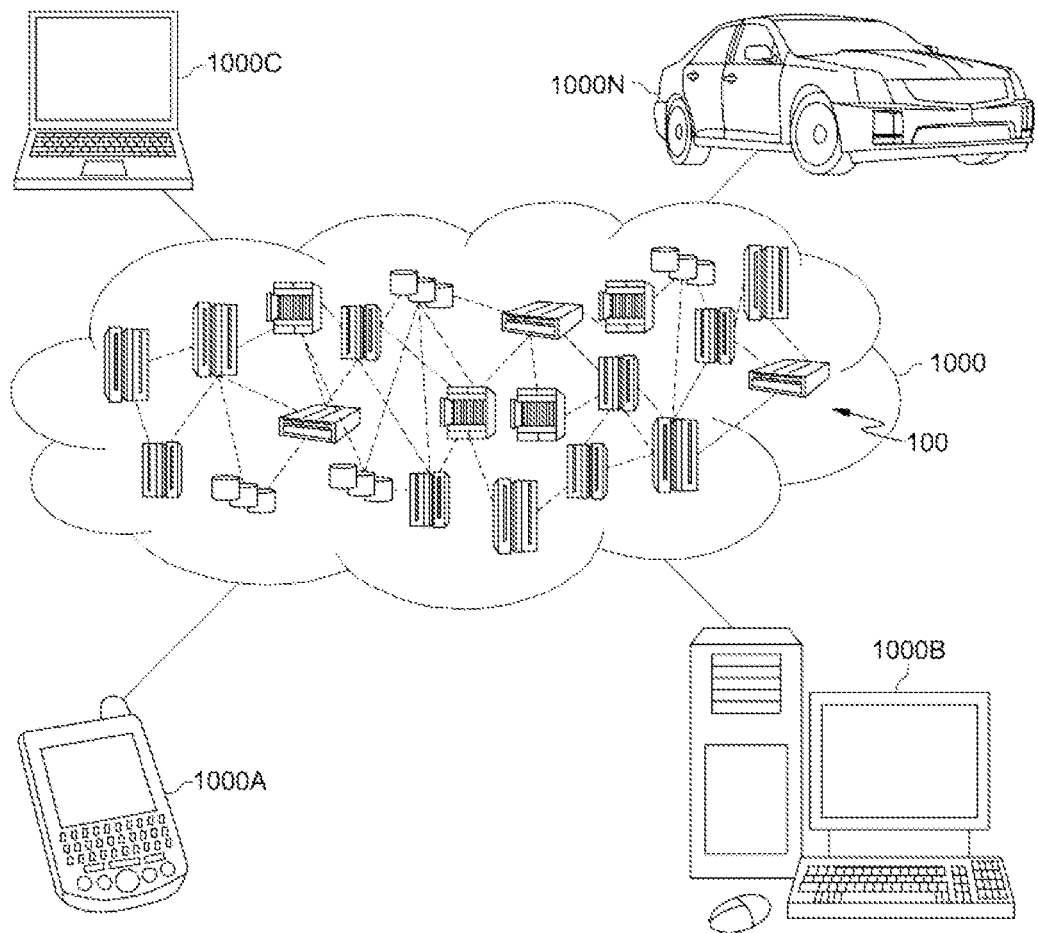
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
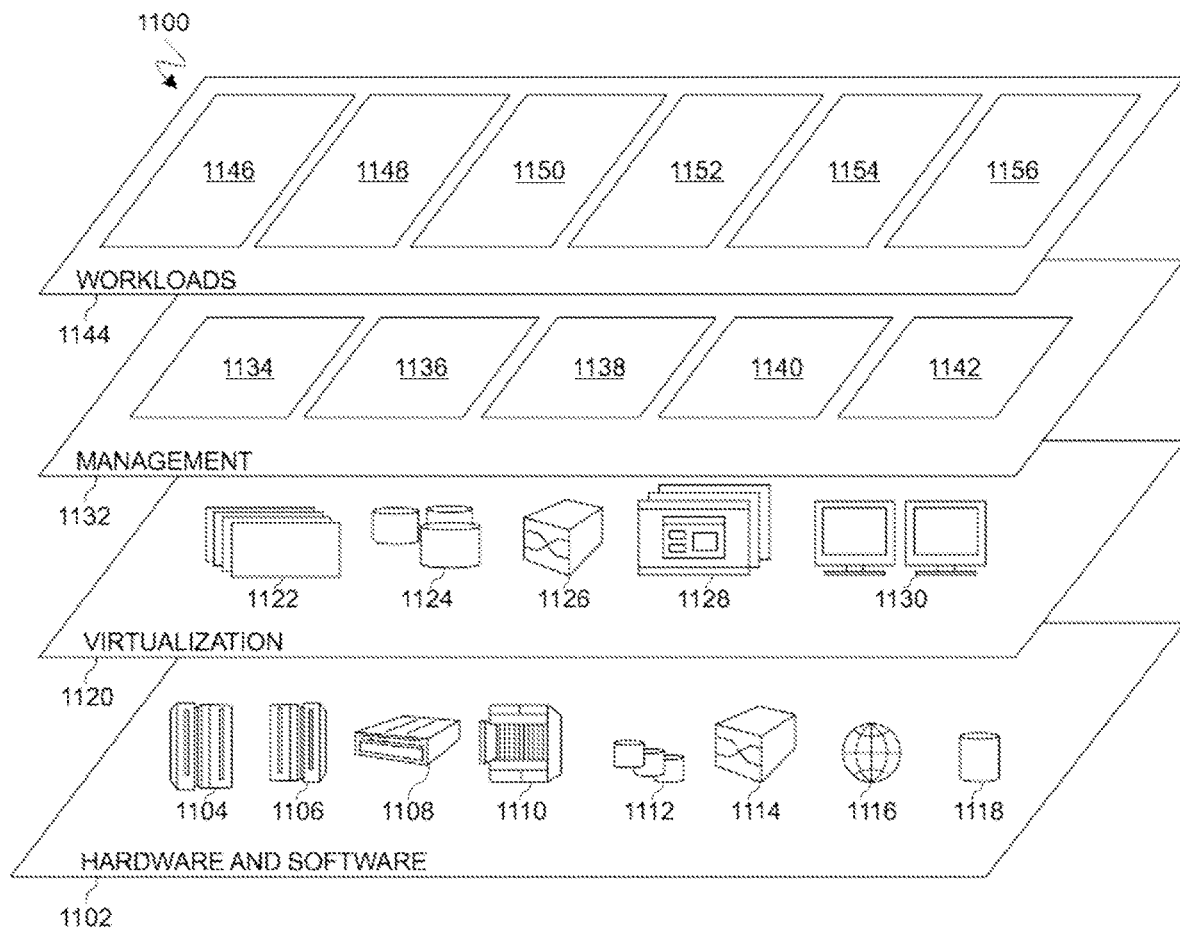
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the environmental impact program 1156. An environmental impact program 110a, 110b provides a way to identify one or more stubble burning areas and determine an environmental impact for the one or more stubble burning areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for environmental impact estimations, the method comprising:
    obtaining data pertaining to an agricultural area identified by a user in an environmental impact user interface, wherein the agricultural area is comprised of a plurality pixels corresponding to a ground area, wherein the data includes coarse resolution greenhouse gas emissions data and fine resolution explanatory variable data;
    deriving one or more features from the data pertaining to the agricultural area;
    displaying one or more stubble burning areas to the user in the environmental impact user interface, wherein the one or more stubble burning areas are identified within the agricultural area using a trained machine learning model, wherein the trained machine learning model utilizes the one or more derived features as input for a crop agnostic binary classification model;
    determining greenhouse gas emission estimates for the one or more stubble burning areas using a stacked super resolution convolutional neural network by performing a layer by layer enhancement based on the coarse resolution greenhouse gas emissions data and the fine resolution explanatory variable data, wherein the convolutional neural network learns a functional mapping between the fine resolution and coarse resolution data; and
    determining an environmental impact for each of the one or more stubble burning areas, wherein the environmental impact includes the greenhouse gas emission estimates for each pixel of the one or more stubble burnings areas within the plurality of pixels corresponding to the ground area based on the functional mapping of the one or more stubble burning areas.

2. The method of claim 1, wherein the one or more derived features from the data pertaining to the agricultural area include a SAR power spectrum, a SAR decomposition, and a signal superposition.

3. The method of claim 2, wherein the one or more stubble burning areas are comprised of one or more burnt pixels, the one or more burnt pixels being classified using the crop agnostic binary classification model, wherein the trained machine learning model is trained utilizing data from a verified fire information database, wherein at least the SAR power spectrum and the signal superposition are normalized using cohort analytics to build the crop agnostic binary classification model.

4. The method of claim 1, wherein determining the environmental impact for each of the one or more stubble burning areas further comprises:
    utilizing one or more explanatory variables and greenhouse gas emissions data as input for a deep learning model, wherein the deep learning model is the convolutional neural network; and
    upscaling the one or more explanatory variables using one or more standard interpolation techniques.

5. The method of claim 4, further comprising:
    determining the greenhouse gas emissions for each of one or more burnt pixels classified by the crop agnostic binary classification model using the deep learning model; and
    displaying the greenhouse gas emissions for each of the one or more burnt pixels to the user within the environmental impact user interface, wherein the greenhouse gas emissions data is presented separately for each of a plurality of greenhouse gases.

6. The method of claim 1, wherein determining the environmental impact for each of the one or more stubble burning areas further comprises:
    allocating coarse greenhouse gas emissions data to a finer spatial resolution using a statistical model, wherein the statistical model utilizes a FRK technique in enhancing the coarse resolution greenhouse gas emissions data based on one or more fine resolution covariates.

7. The method of claim 1, wherein the data pertaining to the agricultural area includes contextual information, wherein the contextual information is utilized in deriving cohort analytics to normalize one or more time series features of the one or more derived features from the data pertaining to the agricultural area.

8. The method of claim 7, further comprising:
    identifying one or more cohort groups within the agricultural area based on a similarity score generated for each of a plurality of agricultural fields within the agricultural area, wherein the similarity score is generated by a multi-class classification model utilizing the cohort analytics as input, wherein the contextual information is weighted according to preferences specified by the user in the environmental impact user interface.

9. The method of claim 8, further comprising:
    utilizing the one or more cohort groups identified to refine the input for the crop agnostic binary classification model.

10. The method of claim 1, further comprising:
    displaying the one or more stubble burning areas identified to the user in the environmental impact user interface using one or more visual representations and a classification for each of a plurality of pixels comprising the agricultural area.

11. The method of claim 1, wherein the greenhouse gas emissions estimates are an output of a deep learning model utilizing a stacked super resolution convolutional neural network technique to enhance a spatial resolution of greenhouse gas emissions data by utilizing both coarse resolution greenhouse gas emissions data and fine resolution explanatory variable data as input.

12. A computer system for environmental impact estimations, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        obtaining data pertaining to an agricultural area identified by a user in an environmental impact user interface, wherein the agricultural area is comprised of a plurality pixels corresponding to a ground area, wherein the data includes coarse resolution greenhouse gas emissions data and fine resolution explanatory variable data;

deriving one or more features from the data pertaining to the agricultural area;

displaying one or more stubble burning areas to the user in the environmental impact user interface, wherein the one or more stubble burning areas are identified within the agricultural area using a trained machine learning model, wherein the trained machine learning model utilizes the one or more derived features as input for a crop agnostic binary classification model;

determining greenhouse gas emission estimates for the one or more stubble burning areas using a stacked super resolution convolutional neural network by performing a layer by layer enhancement based on the coarse resolution greenhouse gas emissions data and the fine resolution explanatory variable data, wherein the convolutional neural network learns a functional mapping between the fine resolution and coarse resolution data; and determining an environmental impact for each of the one or more stubble burning areas, wherein the environmental impact includes the greenhouse gas emission estimated for each pixel of the one or more stubble burning areas within the plurality of pixels corresponding to the ground area based on the functional mapping of the one or more stubble burning areas.

13. The computer system of claim 12, wherein the one or more derived features from the data pertaining to the agricultural area include a SAR power spectrum, a SAR decomposition, and a signal superposition.

14. The computer system of claim 13, wherein the one or more stubble burning areas are comprised of one or more burnt pixels, the one or more burnt pixels being classified using the crop agnostic binary classification model, wherein the trained machine learning model is trained utilizing data from a verified fire information database, wherein at least the SAR power spectrum and the signal superposition are normalized using cohort analytics to build the crop agnostic binary classification model.

15. The computer system of claim 12, wherein determining the environmental impact for each of the one or more stubble burning areas further comprises:
utilizing one or more explanatory variables and greenhouse gas emissions data as input for a deep learning model, wherein the deep learning model is the convolutional neural network; and
upscaling the one or more explanatory variables using one or more standard interpolation techniques.

16. The computer system of claim 12, wherein determining the environmental impact for each of the one or more stubble burning areas further comprises:
allocating coarse greenhouse gas emissions data to a finer spatial resolution using a statistical model, wherein the statistical model utilizes a FRK technique in enhancing the coarse resolution greenhouse gas emissions data based on one or more fine resolution covariates.

17. A computer program product for environmental impact estimations, comprising:
one or more non-transitory computer-readable storage media and program instructions stored on at least one of the one or more tangible storage media, the program instructions executable by a processor to cause the processor to perform a method comprising:
obtaining data pertaining to an agricultural area identified by a user in an environmental impact user interface, wherein the agricultural area is comprised of a plurality pixels corresponding to a ground area, wherein the data includes coarse resolution greenhouse gas emissions data and fine resolution explanatory variable data;

deriving one or more features from the data pertaining to the agricultural area;

displaying one or more stubble burning areas to the user in the environmental impact user interface, wherein the one or more stubble burning areas are identified within the agricultural area using a trained machine learning model, wherein the trained machine learning model utilizes the one or more derived features as input for a crop agnostic binary classification model;

determining greenhouse gas emission estimates for the one or more stubble burning areas using a stacked super resolution convolutional neural network by performing a layer by layer enhancement based on the coarse resolution greenhouse gas emissions data and the fine resolution explanatory variable data, wherein the convolutional neural network learns a functional mapping between the fine resolution and coarse resolution data; and determining an environmental impact for each of the one or more stubble burning areas, wherein the environmental impact includes the greenhouse gas emission estimated for each pixel of the one or more stubble burning areas within the plurality of pixels corresponding to the ground area based on the functional mapping of the one or more stubble burning areas.

18. The computer program product of claim 17, wherein the one or more derived features from the data pertaining to the agricultural area include a SAR power spectrum, a SAR decomposition, and a signal superposition.

19. The computer program product of claim 18, wherein the one or more stubble burning areas are comprised of one or more burnt pixels, the one or more burnt pixels being classified using the crop agnostic binary classification model, wherein the trained machine learning model is trained utilizing data from a verified fire information database, wherein at least the SAR power spectrum and the signal superposition are normalized using cohort analytics to build the crop agnostic binary classification model.

20. The computer program product of claim 17, wherein determining the environmental impact for each of the one or more stubble burning areas further comprises:
utilizing one or more explanatory variables and greenhouse gas emissions data as input for a deep learning model, wherein the deep learning model is the convolutional neural network; and
upscaling the one or more explanatory variables using one or more standard interpolation techniques.

* * * * *